Patented Oct. 4, 1949

2,483,465

UNITED STATES PATENT OFFICE 2,483,465

BOOKBINDING PROCESS

Charles C. Johnson, Newburgh, N. Y., assignor to E. I. du Pont de Nemours & Company, Wilmington, Del., a corporation of Delaware No Drawing. Application July 2, 1946, Serial No. 681,149

6 Claims. (Cl. 154—141)

This invention relates to the treatment of a vinyl resin containing surface where it is essential to adhere paper, fabric, or similar materials to the surface with ordinary commercial hydrophilic pastes and glues, and more particularly to the use of such materials in the bookbinding art.

In the past, woven or non-woven fibrous bases coated with cellulose derivative compositions have been used extensively in the bookbinding art. More recently various synthetic resin coated fabrics have been introduced for use as bookbinding materials because of certain desirable properties, for example, they are easily worked in the bindery, may be easily cleaned and in general withstand hard usage. A disadvantage with vinyl resin coated fabric bookbinding material is the inability to obtain adhesion of paper or similar materials directly on the coated surface with the regular hydrophilic adhesives or glues commonly employed.

The invention has as an object the production of a sizing composition which has the property of forming a strong bond between polyvinyl resin coatings and hydrophilic glues. A further object is the provision of a method for adhering paper or other similar materials to polyvinyl resin coatings with the use of regular hydrophilic bookbinding adhesives such as animal glues and pastes. A specific object is the provision of a method for making a book cover which involves adhering paper to a polyvinyl resin binding material by means of a hydrophilic adhesive.

These and other important objects are accomplished by the following invention which involves the application of an organic solution of a synthetic resin to a polyvinyl chloride resin containing surface, allowing the solvent to evaporate and adhering a sheet of paper to the treated surface by means of a hydrophilic adhesive.

The sizing composition employed in the present invention is designed for application to the binding material at some time subsequent to the manufacture of the binding material itself and is particularly adapted for application to binding material even after the latter has been converted into book covers.

A very satisfactory book cover was made as described hereinafter:

A vinyl chloride resin coated fabric suitable for bookbinding material was cut to the desired shape with mitred corners having dimensions greater than the paper binder boards to which the uncoated side was adhered with conventional water soluble glue or paste. The coating on the fabric had the following approximate composition:

|  | Per cent |
|---|---|
| Polyvinyl chloride resin | 39.2 |
| Pigments | 41.0 |
| Plasticizers | 19.8 |

The edges of the coated fabric bookbinding material extended from ½" to 1" beyond the edges of the binder boards. There are usually three separate paper binder boards to form the front, back, and backbone of the book. The overlapping edges of the coated fabric were turned over and the uncoated side adhered to the binder board by means of the water soluble bookbinding paste. The exposed coated surface on the turned edges of the coated fabric was brushed lightly with the following sizing composition:

*Sizing composition I*

|  | Per cent |
|---|---|
| Vinyl resin | 10.0 |
| Methyl ethyl ketone | 90.0 |

The vinyl resin used was a copolymer, the approximate composition of which may vary within the following limits:

|  | Per cent by weight |
|---|---|
| Combined vinyl chloride | 80.0 to 90.0 |
| Combined vinyl acetate | 19.7 to 7.0 |
| Maleic or similar alpha beta olefinic unsaturated carboxylic acid | .3 to 3.0 |

The resin may be produced in accordance with U. S. Patent 2,329,456, issued Sept. 14, 1943 to William E. Campbell, Jr., and the limitations set forth in the disclosure of that patent apply here.

After the sizing composition was applied, the methyl ethyl ketone was allowed to evaporate. Immediately after drying or after standing for a prolonged period, a water soluble paste as commonly employed in the bookbinding art was applied to one side of a sheet of paper, commonly referred to as an endsheet, the dimensions of which are slightly less than the binder board.

The wet paste was immediately brought in contact with the binder board and the turned and sized edges of the coated fabric. The assembly was allowed to dry overnight under pressure. Any water soluble paste commonly used in the bookbinding art may be used for this purpose. A typical paste has the following approximate composition:

|  | Per cent |
|---|---|
| Wheat flour | 24.50 |
| Glucose | 25.00 |
| Beta naphthol | 0.15 |
| Ammonium alum | 0.35 |
| Water | 50.00 |

After drying overnight that portion of the paper contacting the coated fabric could not be separated from the vinyl resin coated fabric.

A similar book cover made with the same coated fabric, binder board, water soluble paste, and endsheet paper and without the sizing composition was not considered satisfactory since the endsheet paper was not firmly adhered to the coated fabric and readily separated therefrom on mild flexing.

Another sizing composition which gives satisfactory results for adhering hydrophilic compositions to polyvinyl chloride resin coatings, has the following composition:

*Sizing composition II*

| | Per cent |
|---|---|
| Vinyl resin (as in Example I) | 9.1 |
| Carbitol acetate (diethylene glycol monoethyl ether acetate) | 9.1 |
| Methyl ethyl ketone | 81.8 |

The carbitol acetate is a high boiling (217.7° C. B. P.) water soluble ester miscible with methyl ethyl ketone and exerts a solvent action on the vinyl resin, as well as the polyvinyl chloride resin coating of the bookbinding material.

Another modification of the sizing composition involves a plasticizer for the vinyl resin:

*Sizing composition III*

| | Per cent |
|---|---|
| Vinyl resin (As in Example I) | 9.5 |
| Dioctyl phthalate | 4.8 |
| Methyl ethyl ketone | 85.7 |

The above composition gave satisfactory results as an endsheet size when used in the same manner as outlined above for sizing composition of Example I.

In preparing the sizing compositions the resin is first dissolved in the methyl ethyl ketone. The time required for dissolving the resin can be reduced by the application of heat by means of a steam jacketed kettle. Solvents other than methyl ethyl ketone can be employed such as methyl isobutyl ketone, acetone as well as other ketones.

The time available for the evaporation of the solvent before applying the hydrophilic paste will determine the choice of solvent with appropriate evaporation rate. It is within the scope of this invention to add coloring materials such as dyes and pigments to the sizing compositions in order that the sizes will have the same color as the surface to which it is applied.

Throughout the description of the invention, reference is made to the sizing of polyvinyl chloride resin containing surfaces. The sizing compositions can also be used for rendering the surface of other resin compositions receptive to water soluble adhesives. Such other resins include copolymers of vinyl chloride obtained by polymerizing monomeric vinyl chloride in the presence of other monomers copolymerizable therewith, such as diesters of fumaric or maleic acid including dimethyl, diethyl, dibutyl, dipropyl, fumarate and maleate, copolymers of vinyl chloride and esters of acrylic acid, copolymers of vinyl chloride and vinylidene chloride and copolymers of vinyl chloride and vinyl esters of organic acids such as vinyl acetate. In addition to the above mentioned vinyl chloride resin surfaces, the sizing compositions of this invention may be used for the surface treatment of compositions containing acrylic and methacrylic acid esters in polymeric form.

The resins mentioned in the foregoing paragraph are referred to as vinyl resins in the appended claims.

While the invention has been described with respect to the bookbinding art, it will also find wide use in other arts. Due to the current textile fabric shortage there has recently been introduced on the market unsupported films of polyvinyl chloride resin compositions for use where coated fabrics have served in the past. In making luggage, optical cases, typewriter cases, and a host of other decorated cases, it is necessary to adhere the unsupported vinyl chloride resin films to paper, wood, metal, etc. The sizing compositions described above are particularly adapted for rendering the unsupported vinyl chloride resin films receptive to hydrophilic adhesives. The compositions of this invention will find utility as a surface size for polyvinyl chloride resin coatings wherever it is desired to adhere such vinyl chloride resin surfaces to other surfaces or to themselves by means of water soluble adhesives.

It will be readily apparent to those skilled in the art that many widely different embodiments of this invention may be made without departing from the spirit and scope thereof and therefore, it is not intended to be limited except as defined in the appended claims.

I claim:

1. Bookbinding material to which animal glue will adhere tenaciously which comprises a film of polyvinyl chloride and a surface sizing coat of a composition containing a copolymer of from 80% to 90% of vinyl chloride, from 19.7% to 7.0% vinyl acetate and from .3% to 3.0% of an alpha beta olefinic unsaturated carboxylic acid.

2. The product of claim 1 in which the carboxylic acid is maleic acid.

3. In a book, a cover which has a surface film of a composition containing polyvinyl chloride and a size thereover containing a copolymer of from 80% to 90% of vinyl chloride, from 19.7% to 7.0% of vinyl acetate and from .3% to 3.0% of an alpha beta olefinic unsaturated carboxylic acid, the said book having portions of the coated cover joined by means of a hydrophilic adhesive.

4. The article of claim 3 in which the carboxylic acid is maleic acid.

5. The process of adhering surfaces containing a polyvinyl chloride resin to another surface which comprises coating the vinyl chloride resin surface with a size containing a copolymer of from 80% to 90% of vinyl chloride, from 19.7% to 7.0% of vinyl acetate and from .3% to 3.0% of an alpha beta olefinic unsaturated carboxylic acid, applying a hydrophilic adhesive to the said size and while the adhesive is moist bringing another surface receptive to the said hydrophilic adhesive in contact therewith under pressure and allowing the adhesive to dry.

6. The process of claim 5 in which the carboxylic acid is maleic acid.

CHARLES C. JOHNSON.

REFERENCES CITED

The following references are of record in the file of this patent:

UNITED STATES PATENTS

| Number | Name | Date |
|---|---|---|
| 1,745,977 | Brenne | Feb. 4, 1930 |
| 1,985,898 | Hyden et al. | Jan. 1, 1935 |

OTHER REFERENCES

"New Vinyl Resin for Air-Dry and Low-Bake Coatings," by A. K. Doolittle and G. M. Powell, published in Paint, Oil and Chem. Rev., vol. 107, No. 7 (April 6, 1944), pages 9, 10, 11 and 40.